United States Patent
Kim et al.

(10) Patent No.: US 9,242,532 B2
(45) Date of Patent: Jan. 26, 2016

(54) AIR CONDITIONER SYSTEM CONTROL METHOD FOR VEHICLE

(71) Applicant: Hyundai Motor Company, Seoul (KR)

(72) Inventors: Jae Yeon Kim, Whasung-si (KR); Hong Rok Shim, Wahsung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/327,233

(22) Filed: Jul. 9, 2014

(65) Prior Publication Data

US 2015/0165869 A1    Jun. 18, 2015

(30) Foreign Application Priority Data

Dec. 18, 2013    (KR) .................. 10-2013-0158686

(51) Int. Cl.
*B60H 1/00*    (2006.01)

(52) U.S. Cl.
CPC ........ *B60H 1/00885* (2013.01); *B60H 1/00764* (2013.01)

(58) Field of Classification Search
CPC ............. B60H 1/00885; B60H 1/3205; B60H 1/3208; B60H 1/3222; B60H 1/00071; B60H 1/00899
See application file for complete search history.

(56) References Cited

U.S. PATENT DOCUMENTS

| | | | |
|---|---|---|---|
| 6,868,809 B1* | 3/2005 | Robb | 123/41.47 |
| 2002/0015647 A1* | 2/2002 | Nakagaki et al. | 417/363 |
| 2003/0079718 A1* | 5/2003 | Kadoi | 123/339.17 |
| 2008/0295530 A1* | 12/2008 | Sawada et al. | 62/129 |
| 2010/0161134 A1* | 6/2010 | Takahashi | 700/276 |
| 2011/0048671 A1* | 3/2011 | Nishikawa et al. | 165/42 |
| 2011/0246007 A1* | 10/2011 | Choi et al. | 701/22 |

FOREIGN PATENT DOCUMENTS

| | | |
|---|---|---|
| JP | 2782968 B2 | 5/1998 |
| JP | 2004-353554 A | 12/2004 |
| JP | 4985594 B2 | 7/2012 |
| JP | 2013-154755 A | 8/2013 |
| KR | 10-0188067 B1 | 6/1999 |
| KR | 100219321 B1 | 6/1999 |
| KR | 10-2013-0026872 A | 3/2013 |

\* cited by examiner

*Primary Examiner* — Rodney Butler
(74) *Attorney, Agent, or Firm* — Morgan, Lewis & Bockius LLP

(57) ABSTRACT

A method of controlling an automotive air-conditioning system includes compressing a refrigerant by sensing the operation of an air conditioner while a vehicle is driven after starting an engine of the vehicle, circulating the cooling water cooled by exchanging heat with external air in the cooling module to cool the intercooler or the electric device, and controlling operation speeds of a water pump in the cooling system and of a cooling fan, while keeping the vehicle idling or running, and ending the control by determining whether vehicle speed, pressure of the air conditioner, temperature of the cooling water, and temperature of the intercooler or the electric device are within predetermined values.

13 Claims, 2 Drawing Sheets

AIR CONDITIONER SYSTEM CONTROL METHOD FOR VEHICLE

CROSS-REFERENCE TO RELATED APPLICATION

The present application claims priority to Korean Patent Application Number 10-2013-0158686 filed Dec. 18, 2013, the entire contents of which are incorporated herein for all purposes by this reference.

BACKGROUND OF INVENTION

1. Field of the Invention

The present invention relates to a method of controlling an air-conditioning system for a vehicle. More particularly, the present invention relates to a method of controlling an automotive air-conditioning system which minimizes power consumption of an air-conditioning system by controlling a water pump and a cooling fan in accordance with driving conditions of a vehicle and in accordance with whether an air conditioner operates, and which increases the achievable travel distance by improving the cooling performance and reducing pressure.

2. Description of Related Art

In general, air-conditioning apparatuses include an air-conditioning system for heating/cooling the interior of vehicles.

Those air-conditioning systems, which keep the interior of vehicles at desired temperatures by maintaining the temperature of the interior at appropriate levels regardless of changes in external temperature, heat or cool the interior of vehicles using a refrigerant that is discharged from a compressor and exchange heat through an evaporator while circulating through a condenser, a receiver drier, an expansion valve, the evaporator, and the compressor.

That is, in the air-conditioning systems, a high-temperature and high-pressure refrigerant compressed by the compressor condenses through the condenser and reduces the temperature and humidity of an interior by evaporating through the evaporator after passing through the receiver drier and the expansion valve.

There is a need for developing an environmentally-friendly vehicle that can substantially replace the ICE (Internal Combustion Engine) vehicles, with an increasing concern on energy efficiency and the problem with environmental pollution. These environmentally-friendly vehicles generally include electric vehicles driven by a fuel cell or electricity as the power source, and hybrid vehicles driven by an engine and an electric battery.

In electric vehicles, a cooling system that cools the electric parts is provided as a specific closed circuit, in addition to the air-conditioning system, such that the cooling module that is positioned at the front part of the vehicles and supplies refrigerant or cooling water to the systems is complicated.

Further, when a water-cooled condenser is included in the air-conditioning systems of electric vehicles, the circuit for separately supplying cooling water and a refrigerant is complicated and the maximum load conditions and the operation temperatures of the systems are different, such that when the cooling module is cooled in an air-cooled condenser using a cooling fan and running air, the cooling performance of one of the systems is sufficient but the cooling performance of the other is not sufficient.

That is, since the air-conditioning system is provided as a closed circuit separate from the cooling system in the electric vehicles of the related art, when a water-cooled condenser is used, the layout in the small engine compartment is complicated and the power consumption by the compressor, the cooling fan, and the water pump increases due to the difference in cooling performance according to driving conditions, such that the consumption of electricity increases and the achievable travel distance decreases.

Further, since the maximum load conditions of the cooling system and the air-conditioning system are different, the system is difficult to be controlled in the optimum state, such that the cooling performance of the cooling system and the cooling performance of the air-conditioning system are not at their optimum levels.

Therefore, what is needed is a method of controlling an automotive air-conditioning system which minimizes power consumption by an air-conditioning system and increases the travel distance capability of the vehicle, The above information disclosed in this Background section is only for enhancement of understanding of the background of the invention and should not be construed as an acknowledgment or any form of suggestion that this information forms the prior art already known to a person skilled in the art.

BRIEF SUMMARY

Various aspects of the present invention are directed to providing a method of controlling an automotive air-conditioning system which minimizes power consumption by an air-conditioning system and increases the travel distance by improving the cooling performance and reducing pressure, by integrating a cooling system for cooling an electric device or an intercooler in a vehicle, using condensers that are separated to use cooling fluid and external air, respectively, as a heat exchange medium, and controlling the operation of a water pump and a cooling fan in accordance with the running state of a vehicle, the pressure of the air conditioner, and the temperature of the electric device.

In one aspect of the present invention, a method of controlling an automotive air-conditioning system in which a water-cooled condenser condenses a refrigerant with cooling water from a cooling system which cools an intercooler or an electric device in a vehicle and an air-cooled condenser in a cooling module of a cooling system condenses the refrigerant from the water-cooled condenser through heat exchange with external air may include compressing the refrigerant by sensing the operation of an air conditioner while a vehicle is driven after starting an engine of the vehicle, circulating cooling water cooled by exchanging heat with external air in the cooling module to cool the intercooler or the electric device, controlling operation speeds of a water pump in the cooling system and of a cooling fan, while keeping the vehicle idling or running, and ending control by determining whether vehicle speed, pressure of the air conditioner, temperature of the cooling water, and temperature of the intercooler or the electric device are within predetermined values.

Compressing the refrigerant by sensing the operation of an air conditioner while a vehicle is driven after starting an engine of the vehicle may include starting the engine of the vehicle, sensing whether the air conditioner starts operating, and compressing and circulating the refrigerant by operating a compressor.

Circulating cooling water cooled by exchanging heat with external air in the cooling module to cool the intercooler or the electric device may include operating the water pump so that cooling water circulates through the intercooler or the electric device from the cooling module, and operating the cooling fan to cool the high-temperature cooling water in the cooling module into which the cooling water with a temperature increased by cooling the intercooler or the electric device flows, by exchanging heated air with the external air.

The water pump may be operated in accordance with the temperature of the intercooler or the electric device, when the air-conditioning system does not compress the refrigerant by sensing the operation of an air conditioner while a vehicle is driven after starting an engine of the vehicle The water pump may be operated in accordance with a value set as an operation condition of the air conditioner with the vehicle in motion, when the air-conditioning system compresses the refrigerant by sensing the operation of an air conditioner while a vehicle is driven after starting an engine of the vehicle.

The water pump may be operated, in idling, under a condition requiring a larger flow rate of the cooling water which is set in accordance with the temperature of the intercooler or the electric device and the flow rate of cooling water which is set as the condition of the air conditioner with the vehicle in motion, when the air-conditioning system compresses the refrigerant by sensing the operation of an air conditioner while a vehicle is driven after starting an engine of the vehicle.

Controlling the operation speeds of the water pump and the cooling fan, keeping the vehicle idling or running, and ending the control by determining whether the vehicle speed, the pressure of the air conditioner, the temperature of the cooling water, and the temperature of the intercooler or the electric device are within predetermined values may include determining whether the vehicle speed, the pressure of the air conditioner, the temperature of the cooling water, and the temperature of the intercooler or the electric device are within predetermined values, controlling the operation speed of the water pump and the cooling fan and returning to circulate the cooling water cooled by exchanging heat with external air in the cooling module to cool the intercooler or the electric device, when it is determined that the vehicle speed, the pressure of the air conditioner, the temperature of the cooling water, and the temperature of the intercooler or the electric device are not within predetermined values, and operating the water pump and the cooling fan at predetermine values in accordance with the idling or driving mode and ending the control, when it is determined that the vehicle speed, the pressure of the air conditioner, the temperature of the cooling water, and the temperature of the intercooler or the electric device are within predetermined values.

The water pump may be a vibration water pump and the water pump's operation speed is controlled in accordance with control signals from an Engine Control Unit (ECU), such that flow rate of the circulating cooling water may be adjusted.

The intercooler may be used when the vehicle is an internal combustion engine vehicle, and the electric device may be used, when the vehicle is an electric vehicle with a motor or a hybrid vehicle with a motor and an internal combustion engine.

When the method of controlling an automotive air-conditioning system is applied according to an exemplary embodiment of the present invention, it is possible to minimize power consumption for operating the air-conditioning system and reduce power consumption for cooling. This may be achieved by integrating a cooling system for cooling an intercooler or an electric device and the driving system of an internal combustion engine vehicle, or the driving system of an environmentally-friendly vehicle including an electric vehicle and a hybrid vehicle, using the water-cooled and the air-cooled condensers that are separated to use cooling fluid and external air, respectively, as a heat exchange medium, and controlling the operation of a water pump and a cooling fan in accordance with the running state of a vehicle, the pressure of the air conditioner, and the temperature of the intercooler or electric device.

Since it is possible to control the operation of the water pump and the cooling fan in accordance with the state and conditions of the air-conditioning system, it is possible to improve the cooling performance of the air-conditioning system and increase the travel distance with the same power by reducing the power consumption for cooling.

It is understood that the term "vehicle" or "vehicular" or other similar term as used herein is inclusive of motor vehicles in general such as passenger automobiles including sports utility vehicles (SUVs), busses, trucks, various commercial vehicles, watercraft including a variety of boats and ships, aircraft, and the like, and includes hybrid vehicles, alternative fuel vehicles, (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description which together serve to explain certain principles of the present invention.

DETAILED DESCRIPTION

Reference will now be made in detail to various embodiments of the present disclosure, examples of which are illustrated in the accompanying drawings and described below. While the invention(s) will be described in conjunction with exemplary embodiments, it will be understood that the present description is not intended to limit the invention(s) to those exemplary embodiments. On the contrary, the invention (s) is/are intended to cover not only the exemplary embodiments, but also various alternatives, modifications, equivalents, and other embodiments which may be included within the spirit and scope of the invention as defined by the appended claims.

Figure 1:
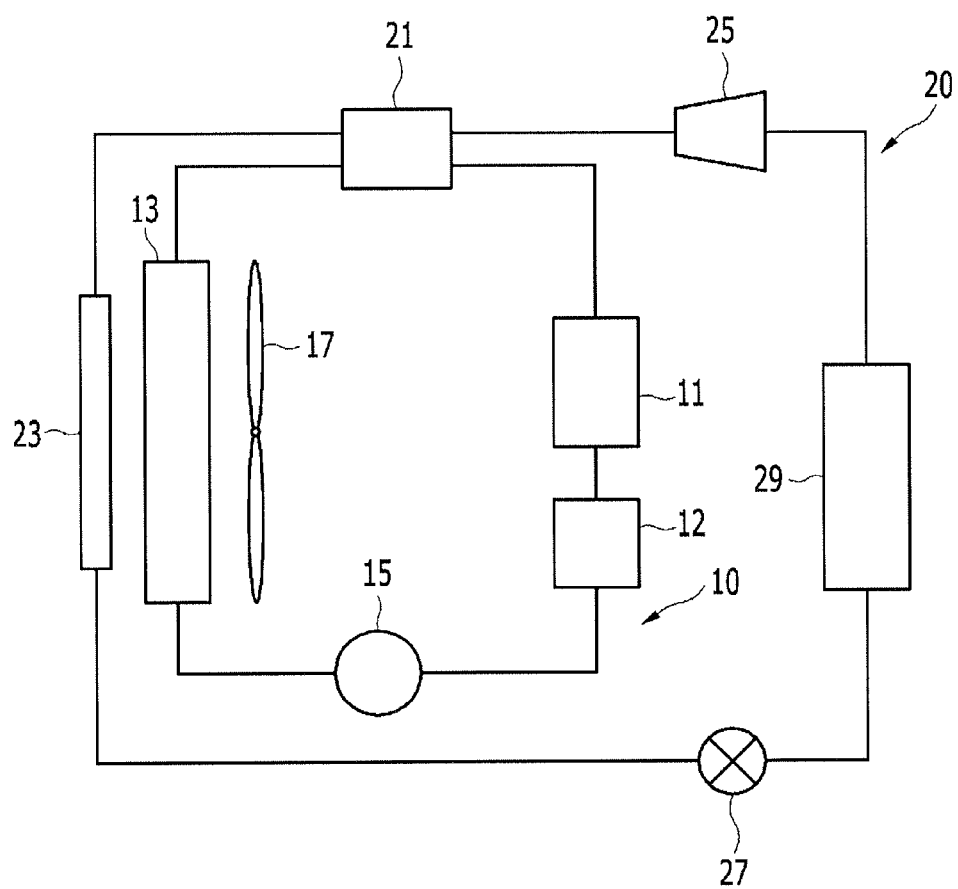
FIG. 1 is a block diagram showing the configuration of a system for cooling and air-conditioning of a vehicle to which a method of controlling an automotive air-conditioning system is applied according to an exemplary embodiment of the present invention.

Hereinafter, an exemplary embodiment of the present invention will be described with reference to the accompanying drawings so that those skilled in the Field of the Invention to which the present invention pertains may carry out the exemplary embodiment. FIG. 1 is a block diagram showing the configuration of a system for cooling and air-conditioning of a vehicle to which a method of controlling an automotive air-conditioning system is applied according to an embodiment of the present invention.

A method of controlling an automotive air-conditioning system according to an exemplary embodiment of the present invention is, as shown in FIG. 1, applied to an air-conditioning system 20 integrated with a cooling system 10. First, the basic cooling system 10 may include of a water pump 15 circulating cooling water through a driving system 11 and an intercooler or an electric device 12, and a cooling module 13 including a radiator and a cooling fan 17 for cooling high-temperature cooling water, which finishes cooling, through heat exchange with external air.

The air-conditioning system 20 may include a water-cooled condenser 21 and an air-cooled condenser 23, which are included in the cooling module 13, a compressor 25 that supplies a compressed refrigerant to the water-cooled condenser 21, an expansion valve 27 that expands the refrigerant condensing through the water-cooled condenser 21 and the air-cooled condenser 23, and an evaporator 29 that evaporates the refrigerant expanding through the expansion valve 27.

Figure 2:
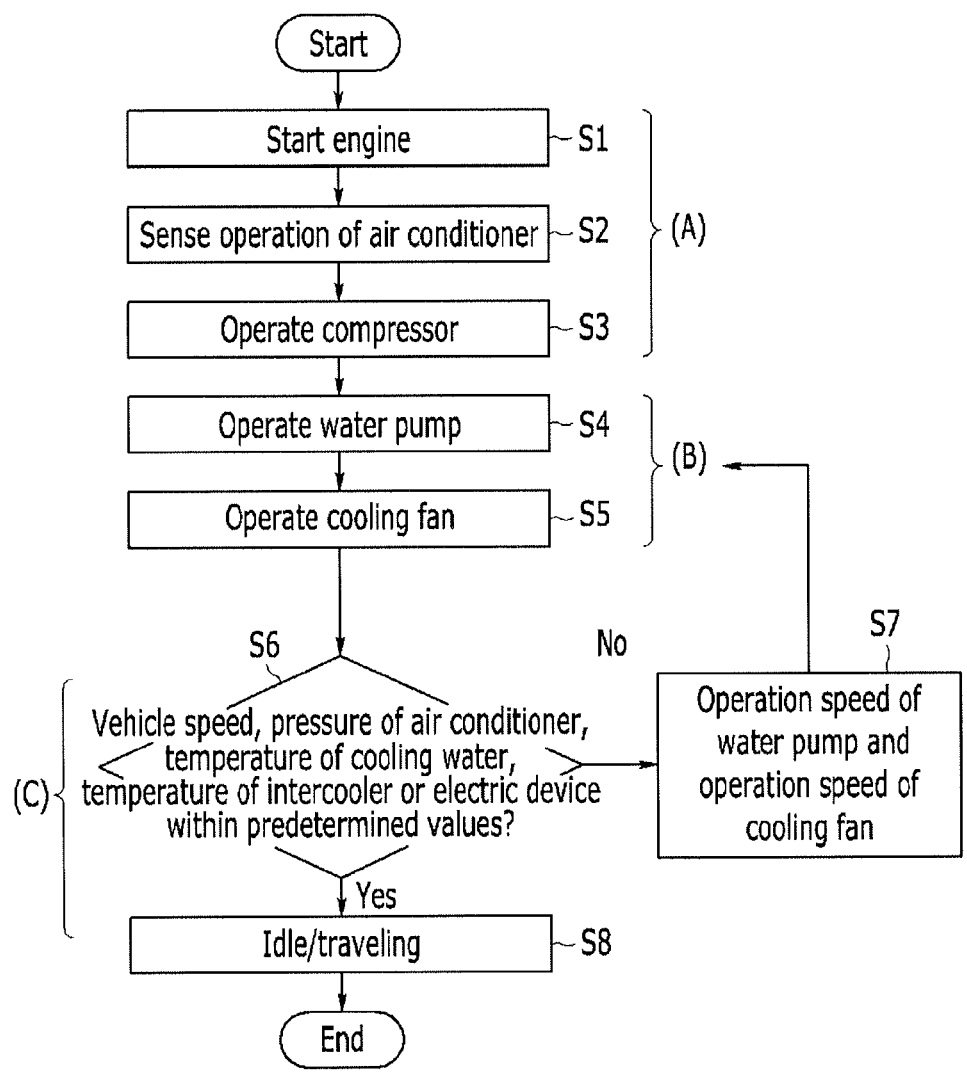
FIG. 2 is a flowchart illustrating the method of controlling an automotive air-conditioning system as applied to the system for cooling and air conditioning a vehicle according to an exemplary embodiment of the present invention.

FIG. 2 is a flowchart illustrating the method of controlling an automotive air-conditioning system as applied to the system for cooling and air conditioning a vehicle according to an exemplary embodiment of the present invention.

In an aspect of the present invention, the method of controlling an automotive air-conditioning system as shown in FIG. 2, may include:

A series of steps (A) of compressing a refrigerant by sensing the operation of an air conditioner while a vehicle is driven after starting an engine of the vehicle.

A series of steps (C) of controlling the operation speeds of the water pump 15 and the cooling fan 17, keeping the vehicle idling or running, and ending control by determining whether the vehicle speed, the pressure of the air conditioner, the temperature of the cooling water, and the temperature of the intercooler or the electric device 12 are within predetermined values, in an air-conditioning system configured as described in FIG. 1.

A series of steps (B) of operating the water pump to circulate cooling water and operating the cooling fan to cool high temperature cooling water.

The series of steps (A) may include starting the engine of the vehicle (S1), sensing whether the air-conditioning is started (S2), and operating the compressor 25 to compress and circulate a refrigerant in order to cool the vehicle (S3).

In steps (B), the water pump 15 is operated so that cooling water circulates through the intercooler or the electric device 12 from the cooling module 13 (S4), and the cooling fan 17 is operated to cool the high-temperature cooling water in the cooling module 13, in which the cooling water with the temperature increased by cooling the flow through the intercooler or the electric device, by sending air with the external air (S5).

The water pump 15 may operate in accordance with the intercooler or the electric device 12, when the air-conditioning system 20 does not operate in the series of steps (A), whereas it may operate in accordance with a value set as an operation condition of the air conditioner when the air-conditioning system 20 operates with the vehicle in motion.

Further, when the air-conditioning system 20 operates in the series of steps (A), the water pump 15 may operate, in idling, under a condition requiring a larger flow rate of cooling water which is set in accordance with the temperature of the intercooler or the electric device 12 and the flow rate of cooling water which is set as the condition of the air conditioner with the vehicle in motion.

In steps (C), it is determined whether the vehicle speed, the pressure of the air conditioner, the temperature of the cooling water, and the temperature of the intercooler or the electric device 12 are within predetermined values, with the water pump 15 and the cooling fan 17 operating (S6).

When it is determined that the vehicle speed, the pressure of the air conditioner, the temperature of the cooling water, and the temperature of the intercooler or the electric device 12 are not within predetermined values, that is, the conditions are not satisfied, in S6, the operation speeds of the water pump 15 and the cooling fan 17 are controlled and it returns to the series of steps (B) (S7).

In contrast, when it is determined that the vehicle speed, the pressure of the air conditioner, the temperature of the cooling water, and the temperature of the intercooler or the electric device 12 are within predetermined values, that is, the conditions are satisfied, the water pump 15 and the cooling fan 17 are operated at predetermined values in accordance with the idling or driving mode (S8), and the control is ended.

The water pump 15 may be a vibration water pump and its operation speed is controlled in accordance with control signals from an ECU, such that flow rate of the circulating cooling water is adjusted.

When the vehicle to which the method of controlling an automotive air-conditioning system described above is applied is an ICE (Internal Combustion Engine) vehicle, the intercooler 12 may be used, and when it is an electric vehicle with a motor or a hybrid vehicle with a motor and an internal combustion engine, the electric device 12 may be used.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A method of controlling an automotive air-conditioning system, wherein a water-cooled condenser condenses a refrigerant with cooling water from a cooling system which cools an intercooler or an electric device in a vehicle and an air-cooled condenser in a cooling module of a cooling system condenses the refrigerant from the water-cooled condenser through heat exchange with external air, the method comprising:

compressing the refrigerant by sensing the operation of an air conditioner while a vehicle is driven after starting an engine of the vehicle;

circulating the cooling water cooled by exchanging heat with external air in the cooling module to cool the intercooler or the electric device; and controlling operation speeds of a water pump in the cooling system and of a cooling fan, while keeping the vehicle idling or running, and ending control by determining whether vehicle speed, pressure of the air conditioner, temperature of the cooling water, and temperature of the intercooler or the electric device are within predetermined values, wherein circulating the cooling water cooled by exchanging heat with external air in the cooling module to cool the intercooler or the electric device comprises:

operating the water pump so that cooling water circulates through the intercooler or the electric device from the cooling module; and operating the cooling fan to cool high-temperature cooling water in the cooling module into which the cooling water with a temperature increased by cooling the intercooler or the electric device flows, and wherein the water pump is operated in accordance with the temperature of the intercooler or the electric device, when the air-conditioning system does not compress the refrigerant by sensing the operation of the air conditioner while the vehicle is driven after starting the engine of the vehicle.

2. The method of claim 1, wherein compressing the refrigerant by sensing the operation of the air conditioner while the vehicle is driven after starting the engine of the vehicle comprises:
starting the engine of the vehicle;
sensing whether the air conditioner starts operating; and
compressing and circulating the refrigerant by operating a compressor.

3. The method of claim 1, wherein the water pump is operated in accordance with a value set as an operation condition of the air conditioner with the vehicle in motion, when the air-conditioning system compresses the refrigerant by sensing the operation of the air conditioner while the vehicle is driven after starting the engine of the vehicle.

4. The method of claim 1, wherein the water pump operates, in idling, under a condition requiring a larger flow rate of the cooling water which is set in accordance with the temperature of the intercooler or the electric device and the flow rate of the cooling water which is set as the condition of the air conditioner with the vehicle in motion, when the air-conditioning system compresses the refrigerant by sensing the operation of an air conditioner while a vehicle is driven after starting the engine of the vehicle.

5. The method of claim 1, wherein controlling the operation speeds of the water pump and the cooling fan, keeping the vehicle idling or running, and ending the control by determining whether the vehicle speed, the pressure of the air conditioner, the temperature of the cooling water, and the temperature of the intercooler or the electric device are within predetermined values comprises:
determining whether the vehicle speed, the pressure of the air conditioner, the temperature of the cooling water, and the temperature of the intercooler or the electric device are within predetermined values;
controlling the operation speed of the water pump and the cooling fan and returning to circulate the cooling water cooled by exchanging heat with external air in the cooling module to cool the intercooler or the electric device, when it is determined that the vehicle speed, the pressure of the air conditioner, the temperature of the cooling water, and the temperature of the intercooler or the electric device are not within predetermined values; and
operating the water pump and the cooling fan at predetermined values in accordance with the idling or driving mode and ending the control, when it is determined that the vehicle speed, the pressure of the air conditioner, the temperature of the cooling water, and the temperature of the intercooler or the electric device are within predetermined values.

6. The method of claim 1, wherein the water pump is a vibration water pump and the water pump's operation speed is controlled in accordance with control signals from an Engine Control Unit (ECU), such that flow rate of the circulating cooling water is adjusted.

7. The method of claim 1, wherein the intercooler is used when the vehicle is an internal combustion engine (ICE) vehicle, and
the electric device is used, when the vehicle is an electric vehicle with a motor or a hybrid vehicle with a motor and an internal combustion engine.

8. The method of claim 3 wherein compressing the refrigerant by sensing the operation of the air conditioner while a vehicle is driven after starting the engine of the vehicle comprises:
starting the engine of the vehicle;
sensing whether the air conditioner starts operating; and
compressing and circulating the refrigerant by operating the compressor.

9. The method of claim 4 wherein compressing the refrigerant by sensing the operation of an air conditioner while a vehicle is driven after starting the engine of the vehicle comprises:
starting the engine of the vehicle;
sensing whether the air conditioner starts operating; and
compressing and circulating the refrigerant by operating the compressor.

10. A method of controlling an automotive air-conditioning system, wherein a water-cooled condenser condenses a refrigerant with cooling water from a cooling system which cools an intercooler or an electric device in a vehicle and an air-cooled condenser in a cooling module of a cooling system condenses the refrigerant from the water-cooled condenser through heat exchange with external air, the method comprising:
compressing the refrigerant by sensing the operation of an air conditioner while a vehicle is driven after starting an engine of the vehicle;
circulating the cooling water cooled by exchanging heat with external air in the cooling module to cool the intercooler or the electric device; and
controlling operation speeds of a water pump in the cooling system and of a cooling fan, while keeping the vehicle idling or running, and ending control by determining whether vehicle speed, pressure of the air conditioner, temperature of the cooling water, and temperature of the intercooler or the electric device are within predetermined values,
wherein circulating the cooling water cooled by exchanging heat with external air in the cooling module to cool the intercooler or the electric device comprises:
operating the water pump so that cooling water circulates through the intercooler or the electric device from the cooling module; and
operating the cooling fan to cool high-temperature cooling water in the cooling module into which the cooling water with a temperature increased by cooling the intercooler or the electric device flows, and
wherein the water pump operates, in idling, under a condition requiring a larger flow rate of the cooling water which is set in accordance with the temperature of the intercooler or the electric device and the flow rate of the cooling water which is set as the condition of the air conditioner with the vehicle in motion, when the air-conditioning system compresses the refrigerant by sensing the operation of an air conditioner while a vehicle is driven after starting the engine of the vehicle.

11. The method of claim 10 wherein compressing the refrigerant by sensing the operation of an air conditioner while a vehicle is driven after starting the engine of the vehicle comprises:
starting the engine of the vehicle;
sensing whether the air conditioner starts operating; and
compressing and circulating the refrigerant by operating the compressor.

12. The method of claim 10, wherein the water pump is a vibration water pump and the water pump's operation speed is controlled in accordance with control signals from an Engine Control Unit (ECU), such that flow rate of the circulating cooling water is adjusted.

13. A method of controlling an automotive air-conditioning system, wherein a water-cooled condenser condenses a refrigerant with cooling water from a cooling system which cools an intercooler or an electric device in a vehicle and an air-cooled condenser in a cooling module of a cooling system condenses the refrigerant from the water-cooled condenser through heat exchange with external air, the method comprising:

- compressing the refrigerant by sensing the operation of an air conditioner while a vehicle is driven after starting an engine of the vehicle;
- circulating the cooling water cooled by exchanging heat with external air in the cooling module to cool the intercooler or the electric device; and
- controlling operation speeds of a water pump in the cooling system and of a cooling fan, while keeping the vehicle idling or running, and ending control by determining whether vehicle speed, pressure of the air conditioner, temperature of the cooling water, and temperature of the intercooler or the electric device are within predetermined values,
- wherein the intercooler is used when the vehicle is an internal combustion engine (ICE) vehicle, and
- the electric device is used, when the vehicle is an electric vehicle with a motor or a hybrid vehicle with a motor and an internal combustion engine.

* * * * *